(12) United States Patent
Wäppling et al.

(10) Patent No.: US 9,321,180 B2
(45) Date of Patent: Apr. 26, 2016

(54) INDUSTRIAL ROBOT DEVICE, AN INDUSTRIAL ROBOT AND A METHOD FOR MANIPULATING OBJECTS

(75) Inventors: Daniel Wäppling, Västerås (SE); Guido Favot, Västerås (SE); Michael Fors, Västerås (SE)

(73) Assignee: ABB Technology Ltd, Zurich (CH)

( * ) Notice: Subject to any disclaimer, the term of this patent is extended or adjusted under 35 U.S.C. 154(b) by 1627 days.

(21) Appl. No.: 12/500,421

(22) Filed: Jul. 9, 2009

(65) Prior Publication Data

US 2009/0269180 A1 Oct. 29, 2009

Related U.S. Application Data

(63) Continuation of application No. PCT/EP2007/060720, filed on Oct. 9, 2007.

(51) Int. Cl.
*B25J 15/04* (2006.01)
*B25J 17/02* (2006.01)
*B25J 15/06* (2006.01)
*B25J 9/00* (2006.01)

(52) U.S. Cl.
CPC ............ *B25J 17/0266* (2013.01); *B25J 9/0051* (2013.01); *B25J 15/04* (2013.01); *B25J 15/0616* (2013.01)

(58) Field of Classification Search
USPC ............... 414/680, 735; 279/3, 137, 143; 74/490.01, 490.06; 901/15, 29
See application file for complete search history.

(56) References Cited

U.S. PATENT DOCUMENTS

| | | | |
|---|---|---|---|
| 4,587,862 A * | 5/1986 | Hoffman | 74/15.88 |
| 4,976,582 A | 12/1990 | Clavel | |
| 6,543,987 B2 * | 4/2003 | Ehrat | 414/735 |
| 6,659,997 B1 | 12/2003 | Casutt | |
| 7,201,087 B2 * | 4/2007 | Chen | 81/438 |
| 7,784,166 B2 * | 8/2010 | Tanner | 29/525.02 |

(Continued)

FOREIGN PATENT DOCUMENTS

| | | |
|---|---|---|
| DE | 202005003748 U1 | 5/2005 |
| EP | 0154227 A1 | 9/1985 |

(Continued)

OTHER PUBLICATIONS

International Search Report; PCT/EP2007/060720; Jan. 14, 2008; 3 pages.

(Continued)

*Primary Examiner* — Ernesto Suarez
*Assistant Examiner* — Brendan Tighe
(74) *Attorney, Agent, or Firm* — Whitmyer IP Group LLC

(57) ABSTRACT

An industrial robot device includes a swivel with an attachment mechanism for the attachment of a tool. The attachment mechanism includes at least two different attachment devices for two different kinds of tools. A first attachment device includes a positioning mechanism defining a certain angular position of an attached tool relative to the swivel. A second attachment device is arranged for allowing an arbitrary angular position of an attached tool relative to the swivel. Also contemplated is an industrial robot that is provided with the invented device and to a method for manipulating objects.

21 Claims, 2 Drawing Sheets

(56) References Cited

U.S. PATENT DOCUMENTS

| | | | |
|---|---|---|---|
| 7,959,371 B2* | 6/2011 | Keightley | 403/348 |
| 2005/0005742 A1 | 1/2005 | Marrocco et al. | |
| 2006/0182602 A1* | 8/2006 | Schuler et al. | 414/735 |
| 2007/0003386 A1 | 1/2007 | Keightley | |

FOREIGN PATENT DOCUMENTS

| | | |
|---|---|---|
| EP | 0391085 A2 | 10/1990 |
| EP | 0638396 A2 | 2/1995 |
| GB | 2335904 A | 10/1999 |
| WO | 0029177 A1 | 5/2000 |
| WO | 02085580 A1 | 10/2002 |

OTHER PUBLICATIONS

Chinese Office Action; Application No. 200780100151.2; Oct. 19, 2011; 7 pages.

* cited by examiner

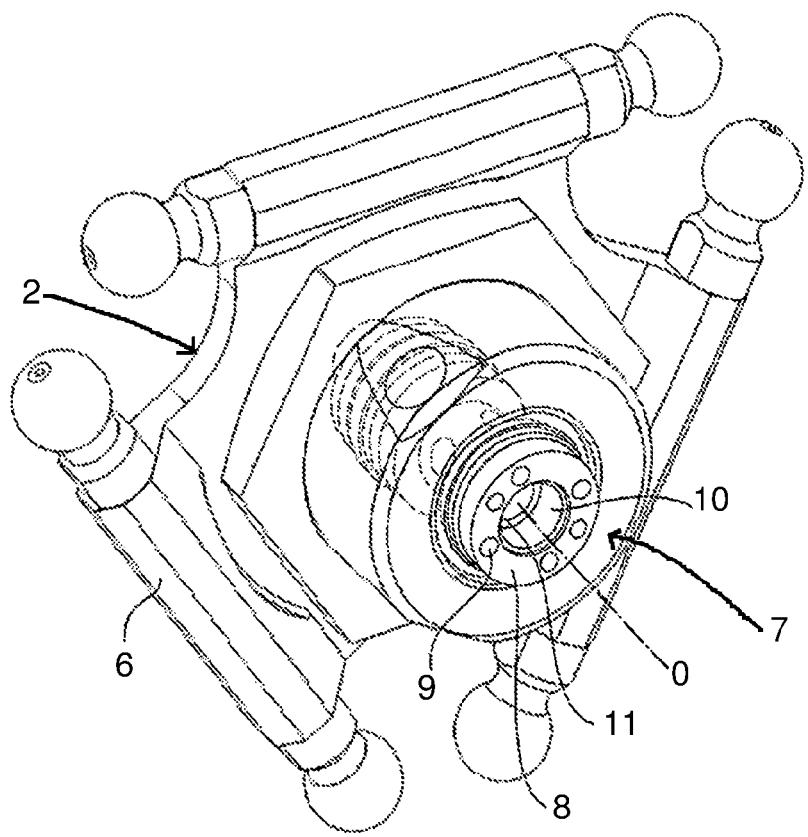
Fig. 2
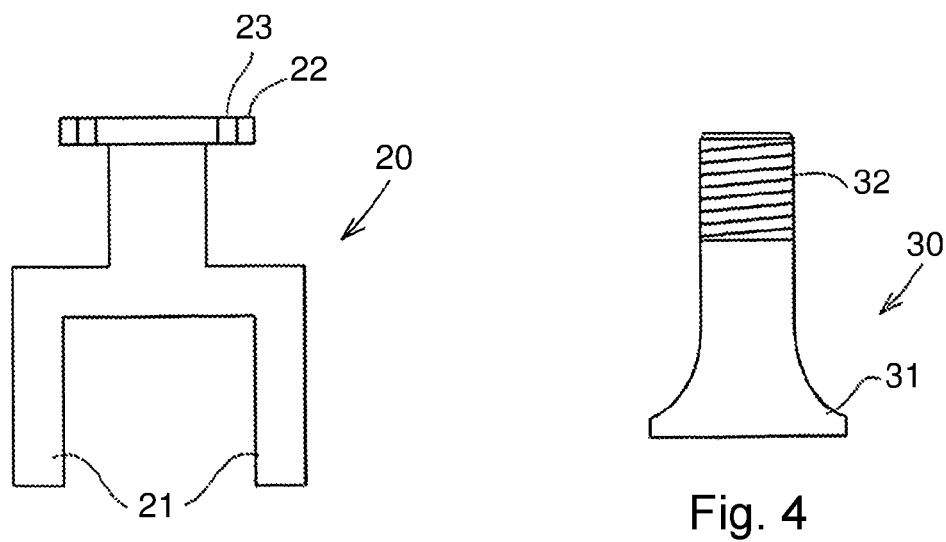
Fig. 3
Fig. 4

INDUSTRIAL ROBOT DEVICE, AN INDUSTRIAL ROBOT AND A METHOD FOR MANIPULATING OBJECTS

CROSS-REFERENCE TO RELATED APPLICATIONS

The present application is a continuation of pending International patent application PCT/EP2007/060720 filed on Oct. 9, 2007 which designates the United States, the content of which is incorporated herein by reference.

FIELD OF THE INVENTION

The present invention relates to an industrial robot device comprising attachment means for the attachment of a tool, to an industrial robot and to a method for manipulating objects.

BACKGROUND OF THE INVENTION

An industrial robot comprises a manipulator and control equipment, whereby the manipulator with the assistance of the control equipment carries out arbitrary operations within a working range. Usually, such a manipulator comprises a plurality of arms which support a hand, on which a tool is arranged. In the majority of robot applications, a traditional six-axis manipulator is used, which exhibits sufficient movability to carry out a wide range of operations with mostly very high accuracy. For certain applications, however, there is a need of a manipulator which has fewer degrees of freedom but which permits faster operations. Such a manipulator may be mechanically connected in such a way that the tool-carrying hand is all the time oriented in space in a predetermined manner.

From U.S. Pat. No. 4,976,582 and WO 00/29177 a manipulator is previously known by means of which a movable element in relation to a stationary element may be moved in a space with retained orientation and retained inclination. The manipulator has three arms which jointly support the movable element. Each of these arms is rotatably journalled in the stationary element around a respective first axis. The arm supports a linkage, one end of which is rotatably journalled in the outer part of the arm, allowing movement in two degrees of freedom. In its other end, the linkage supports the movable element and is journalled therein, allowing a movement in two degrees freedom.

The linkage comprises two parallel links and is arranged, together with the arm, such that one of the degrees of freedom of each end of the linkage constitutes a rotation around an axis which is parallel to the first axis of the respective arm. Irrespective of the movements of the arm or the linkage, these three axes of rotation are thus kept in parallel. In this way, the movable element will always have the same orientation and inclination in relation to the stationary element. One condition, however, is that the respective first axes of the arms form an angle with each other. This kind of industrial robot is usually referred to as parallelkinematic manipulator.

On the movable element on this kind of industrial robot, as well as in various other kinds of industrial robots, the movable element is provided with a swivel for the attachment of a tool for the manipulating. The swivel thus has an attachment device for a certain kind of tool.

In many cases the robot is applied to manipulate different kind of products requiring different kind of tools. This is the case when the products have different geometric shape. There might also be other grounds for the need to change the tool. E.g. in the food industry one product might include nuts whereas another product absolutely has to be free from nuts. If one of the products is not rotation symmetrical it is required to re-calibrate the robot when changing the tool. Alternatively the plate on which the tool is to be attached can be exchanged. This however, requires detaching the arms of the robot that carry the plate. This is complicated and time-consuming.

The object of the present invention is to overcome the above drawbacks and thus to solve the problem of achieving a cost effective operation in cases where two different kinds of tools are required.

DE 20 2005 003 748 U1 discloses a swivel for a manipulator having a certain flexibility. The swivel is built up by modules in order to allow different numbers of pneumatic drives to be connected to the swivel.

SUMMARY OF THE INVENTION

In the context of the present application the terms axial, radial, angular and central all refer to the axis defined by the swivel of device if not otherwise explicitly stated.

The above problem is according to the first aspect of the invention solved in that a device of the kind in question has the specific features that the attachment means includes at least two different attachment devices for two different kinds of tools, a first of said attachment devices including positioning means defining a certain angular position of an attached tool relative to the swivel and a second of said attachment devices being arranged to allow an arbitrary angular position of an attached tool relative to the swivel.

Thanks to the two kinds of attachment device, one and the same swivel can be used for two different kinds of tools. When it is required to use the other tool it is only to detach the mounted tool from its attachment device and attach the other tool in the other attachment device. Thereby exchange from a tool that requires a certain angular position, such as a gripping tool to a tool where its angular orientation does not matter, such as a rotation symmetrical tool, e.g. a suction cup or vice versa can be made very easy and at low cost. This provides for a higher efficiency when such different tools are required during one and the same working process.

The great advantage for the user of the robot thus is that the need for re-calibrating or exchange of the plate on which the tool is attached is eliminated when changing tool. This applies if a non rotation symmetrical tool is exchanged with another non rotation symmetrical tool as well as if a rotation symmetrical tool is exchanged with a non rotation symmetrical tool.

The invention also has the advantage that the device combines the possibility to attach a non rotation symmetrical tool with the advantageous weight effective attachment that usually is applied for rotation symmetrical tools. The invention thus offers the possibility for both weight effective attachment and attachment that includes angular positioning.

According to a preferred embodiment of the device, the attachment means further includes a third attachment device being arranged to allow an arbitrary angular position of an attachment tool relative to the swivel.

This embodiment represents a further step in applying the inventive concept of the present invention, allowing a still higher degree of freedom to exchange tools. Thus this embodiment is of particular interest if for example a further rotation symmetrical tool besides a suction cup is to be employed. This embodiment also has an advantage that also in the case when only one rotary symmetrical tool is required, the swivel is adapted to such tools having different attachment arrangements.

According to a further preferred embodiment the first attachment device includes a radial circumferential mounting surface having a plurality of axial borings.

This is a standard type of attachment device for such tools that requires a certain angular position. It is therefore an advantage to adapt to that. Another advantage is that the attachment device for the tool requiring a certain angular position thereby will be located more remote from the axis than the other attachment device. This increases the angular precision.

According to a further preferred embodiment at least some of these borings are threaded.

This is also a measure for adapting to how a tool of this kind normally is arranged to be attached and further increases the possibility to use the invented swivel for existing tools.

According to a preferred embodiment the second attachment device includes a central threaded boring.

Also this is an adaptation to the usual construction of such tools that can be mounted without need to pay attention to its angular position, which is advantageous for similar reason as those mentioned above. The central arrangement also contributes to obtain the relation that the first attachment device can be provided more radially remote.

According to a further preferred embodiment the third attachment device includes a central threaded boring of a diameter that is different than the diameter of the boring of the second attachment device.

This adapts the swivel to existing tool constructions with increased flexibility.

The above mentioned preferred embodiments of the invented swivel are set out in the claims depending on claim 1.

The invented industrial robot has the specific feature that it is provided with a device according to the present invention or to any of the preferred embodiments thereof.

Such a robot will have advantages of the same kind as mentioned above for the invented device and its preferred embodiments.

According to a preferred embodiment the industrial robot is a parallelkinematic manipulator.

Although the device can be used also for other kinds of industrial robots its advantages are of particular interest in connection with this very type of robot.

According to a further preferred embodiment the robot is arranged for rapid movements. By this is meant a cycle time for the movement in the range of 0.1 to 1.0 seconds. Particularly preferred is the range of 0.3 to 0.6 seconds.

Since many of the situations when the need to work with two different kinds of tool appear in connection with rapid robots the advantages gained by the invented swivel are of particular interest in this context.

According to the further aspect of the invention the object is met in that a method for manipulating objects includes that these are operated by an industrial robot according to the invention.

By the invented method corresponding advantages as mentioned above are achieved.

According to a preferred embodiment of the invented method the objects are food products.

The type of working process for which the invented swivel is of highest interest and the need to interchange the tools during the working process are frequent present in particular within the food industry. Therefore this embodiment is of special importance.

According to a further preferred embodiment the method includes alternatingly attaching a first tool to the first attachment device and a second tool to the second attachment device and alternatingly manipulating the objects with the first and second tools.

Thereby the possibilities offered by the invented robot are made use of and consequently its advantages become valuable.

The invention will be explained more in detail by the following description of an advantageous example thereof and with reference to the accompanying drawings.

BRIEF DESCRIPTION OF THE DRAWINGS

FIG. 2 is a perspective view of a swivel of the device in FIG. 1.

FIG. 3 is a schematic side view of a first tool adapted for attachment to the swivel of FIG. 2.

FIG. 4 is a schematic side view of a second tool adapted for attachment to the swivel of FIG. 2.

DETAILED DESCRIPTION OF THE INVENTION

Figure 1:
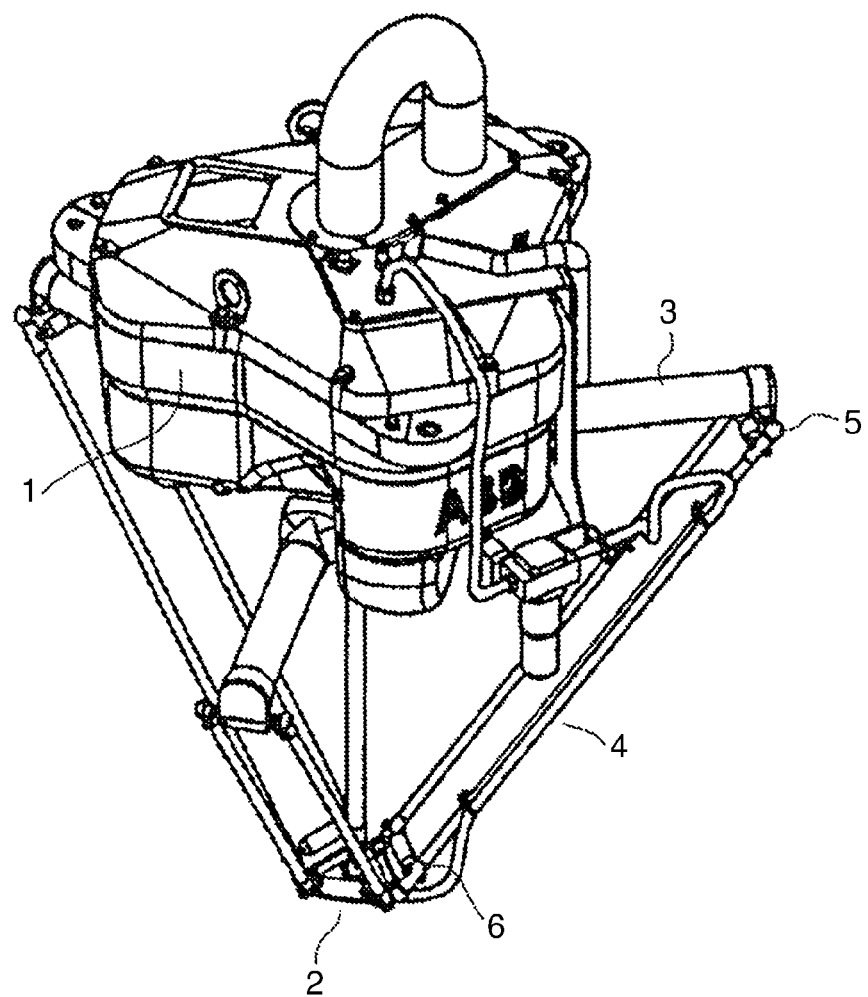
FIG. 1 is a perspective view of an industrial robot.

FIG. 1 illustrates an industrial robot of the type for which a swivel according to the present invention is particularly useful. The robot of FIG. 1 is of a type usually referred to as a parallelkinematic manipulator. The manipulator includes one base member 1, which is stationary and a movable member 2. The base member 1 has three actuators (not shown), each arranged to move a control arm 3 in a pivotal movement. The outer end of each control arm 3 is connected by a linkage 5 to a pair of linking bars 4. Each pair of linking bars is at its other end connected to the movable member 2 by a linkage 6. The movable member 2 remains in parallel with itself, whatever the motions of the control arms may be. The type of manipulator illustrated in FIG. 1 is generally known and needs no detailed explanation.

On the movable member 2 a swivel 7 for the attachment of a tool is provided. The tool is attached to the underside of the movable member 2. The swivel 7 is arranged in a through hole in the movable member 2. Hoses (not shown) are connected radically to the swivel above the movable member 2.

In FIG. 2 this underside of the movable member 2 is illustrated. To the swivel 7 a tool can be attached by either of two different kinds of attachment devices.

A first attachment device is formed by a circumferential surface 8 concentric around the axis 0 of the swivel. The surface 8 is the surface of a plate that is angularly adjustable. The surface is provided with a number of threaded borings 9. A first kind of tool can be attached to the swivel by securing the tool to the circumferential surface 8 by means of bolts. Thereby the tool will have a defined angular position in relation to the swivel. This first attachment device therefore is suitable for tools like a gripping member.

A second attachment device is formed by a central threaded boring 10, coaxial with a central boring 11 in the swivel. This provides for screwing a tool into this boring.

The threaded borings 10, 11 are suitable for the attachment of a tool that does not require a certain angular position such as a sucker.

A third attachment device is formed by the threaded boring 11, coaxial with the central boring 10 and having a smaller diameter than this.

In FIG. 3 a gripping tool 20 provided with a gripping device 21 is illustrated schematically. The gripping tool 20 is adapted to be attached to the first attachment device 8,9 on the swivel 7. On a flange 22 there is a number of borings 23 arranged to match the borings 9 of the first attachment device and is attached thereto by means of bolts.

In FIG. 4 a sucker tool 30 provided with a suction cup 31 is illustrated schematically. The sucker tool 30 is adapted to be attached to the second attachment device on the swivel 7 constituted by the threaded boring 10. The sucker tool has an external thread 32 that fits the threaded boring 10.

When the described industrial robot is applied in a working process that alternatingly requires picking operations by a sucker and gripping operations by a gripping tool the tools 20, 30 illustrated in FIGS. 3 and 4 are exchanged with each other.

What is claimed is:

1. An industrial robot device for attachment of a tool, the device comprising:
   a swivel having an attachment means for the attachment of a tool, wherein the swivel defines an axis of the device and wherein the swivel has a central boring, and
   wherein the attachment means comprises a first attachment means, the first attachment means having a radial surface concentric around the axis of the swivel and said radial surface being adapted for the attachment of a tool, and a second attachment means comprising a threaded portion of the central boring in the swivel.

2. The device of claim 1, wherein the surface of the first attachment means has a plurality of axial borings.

3. The device of claim 2, wherein at least some of the borings of the first attachment means are threaded.

4. The device of claim 1, wherein the second attachment means comprises a first threaded portion of the central boring in the swivel and further comprising a third attachment means comprising a second threaded portion of the central boring in the swivel, said second threaded portion having a diameter that is different from a diameter of the first threaded portion of the central boring in the swivel of the second attachment means.

5. An industrial robot comprising a manipulator and control equipment, said manipulator comprising a plurality of arms supporting a tool carrying device comprising a swivel, the swivel having an attachment means for the attachment of a tool, wherein the swivel defines an axis of the device and wherein the attachment means comprises a first attachment means, the first attachment means having a radial surface concentric around the axis of the swivel and a second attachment means, the second attachment means having a central threaded boring in the swivel.

6. The industrial robot of claim 5, wherein the robot is a parallelkinematic manipulator comprising a stationary base member, a movable member and at least three arms, each of the three arms being rotatably journalled in the stationary base member and the three arms jointly supporting the moveable member, wherein the swivel is arranged in a through hole in the movable member.

7. The industrial robot of claim 5, wherein the robot is arranged for rapid movements, meaning a cycle time for movement in the range of 0.1 to 1.0 seconds.

8. The industrial robot of claim 7, wherein the cycle time for movement is in the range of 0.3 to 0.6 seconds.

9. The industrial robot of claim 5, wherein the attachment means allows for attachment of at least two tools having different attachment arrangements.

10. The industrial robot of claim 5, wherein the first attachment means has positioning means defining a certain angular position of an attached tool relative to the axis.

11. The industrial robot of claim 5, wherein the second attachment means is arranged to allow an arbitrary angular position of an attached tool relative to the axis.

12. The industrial robot of claim 5, wherein a third attachment means is arranged to allow an arbitrary angular position of an attached tool relative to the axis.

13. The industrial robot of claim 5, wherein the first central threaded boring comprises a first central threaded boring in the swivel, and wherein the attachment means further comprises a third attachment means comprising a second central threaded boring in the swivel, said second threaded boring having a diameter that is different from a diameter of the first threaded boring in the swivel of the second attachment means.

14. A method for manipulating objects by an industrial robot having a robot device that comprises a swivel with attachment means for the attachment of a tool, the robot device defining an axis, said method comprising:
   providing the attachment means with at least two different attachment means for attaching two different kind of tools, a first of said attachment means comprising position means defining a certain angular position of an attached tool relative to the axis and a second of said attachment means being arranged to allow an arbitrary angular position of an attached tool relative to the axis;
   attaching a tool on either of said attachment means; and
   manipulating objects by said tool.

15. The method of claim 14, wherein the objects are food products.

16. The method of claim 14, characterized by alternatively attaching a first tool to the first attachment means and a second tool to the second attachment means and alternatively manipulating the objects with the first and second tools.

17. The method of claim 14, characterized in that the first attachment means has a radial surface concentric around the axis of the swivel and the second attachment means has a central boring in the swivel.

18. The method of claim 14, further comprising a third attachment means having a central threaded boring of a diameter that is different than a diameter of a central threaded boring of the second attachment means.

19. An industrial robot device comprising:
   a swivel, the swivel defining an axis of the device, the swivel comprising:
      a radial surface having a plurality of axial borings, such that at least some of the borings are threaded,
      a first central threaded boring, and
      a second central threaded boring of a diameter that is different from the diameter of the first central threaded boring.

20. The industrial robot device of claim 19, wherein the radial surface provides a certain angular position of an attached tool relative to the axis.

21. The industrial robot device of claim 19, wherein the first central threaded boring and the second central threaded boring are arranged to allow an arbitrary angular position of an attached tool relative to the axis.

* * * * *